US009436825B2

(12) United States Patent
Mraz et al.

(10) Patent No.: US 9,436,825 B2
(45) Date of Patent: Sep. 6, 2016

(54) SYSTEM AND METHOD FOR INTEGRITY ASSURANCE OF PARTIAL DATA

(71) Applicant: Owl Computing Technologies, Inc., Ridgefield, CT (US)

(72) Inventors: Ronald Mraz, South Salem, NY (US); Gabriel Silberman, Hastings on Hudson, NY (US)

(73) Assignee: Owl Computing Technologies, Inc., Ridgefield, CT (US)

( * ) Notice: Subject to any disclaimer, the term of this patent is extended or adjusted under 35 U.S.C. 154(b) by 79 days.

(21) Appl. No.: 14/224,127

(22) Filed: Mar. 25, 2014

(65) Prior Publication Data

US 2015/0278520 A1 Oct. 1, 2015

(51) Int. Cl.
| | |
|---|---|
| *G06F 12/14* | (2006.01) |
| *H04L 29/06* | (2006.01) |
| *G06F 11/30* | (2006.01) |
| *G06F 21/56* | (2013.01) |
| *G06F 17/30* | (2006.01) |
| *G06F 21/62* | (2013.01) |

(52) U.S. Cl.
CPC ....... *G06F 21/565* (2013.01); *G06F 17/30082* (2013.01); *G06F 17/30371* (2013.01); *G06F 21/562* (2013.01); *G06F 21/567* (2013.01); *G06F 21/6218* (2013.01); *G06F 2221/034* (2013.01); *H04L 63/145* (2013.01)

(58) Field of Classification Search
CPC . H04L 63/145; G06F 21/565; G06F 21/6218
USPC .............................. 726/23, 24; 713/165, 188
See application file for complete search history.

(56) References Cited

U.S. PATENT DOCUMENTS

| | | | |
|---|---|---|---|
| 5,703,562 A | 12/1997 | Nilsen | |
| 7,941,526 B1 | 5/2011 | Hope et al. | |
| 7,992,209 B1 | 8/2011 | Menoher et al. | |
| 8,068,504 B2 | 11/2011 | Mraz | |
| 8,132,073 B1* | 3/2012 | Bowers et al. | ............... 714/755 |
| 8,250,235 B2 | 8/2012 | Harvey et al. | |
| 8,250,655 B1* | 8/2012 | Malanov | ............... H04L 63/145 |
| | | | 713/165 |
| 8,352,450 B1 | 1/2013 | Mraz et al. | |
| 8,380,913 B2 | 2/2013 | Goldring | |
| 2002/0095598 A1* | 7/2002 | Camble | ............... G06F 11/1451 |
| | | | 726/26 |
| 2005/0203851 A1* | 9/2005 | King | ................ G06F 17/30067 |
| | | | 705/51 |
| 2009/0328183 A1* | 12/2009 | Frenkel et al. | ................ 726/11 |
| 2012/0005750 A1* | 1/2012 | Satish | ............. 726/23 |
| 2014/0032799 A1* | 1/2014 | Dickson | ................. G06F 13/00 |
| | | | 710/104 |

\* cited by examiner

*Primary Examiner* — Aravind Moorthy
(74) *Attorney, Agent, or Firm* — John S. Economou (57) ABSTRACT

A system is disclosed for assuring the integrity of file segments. A first server has an associated file repository storing a plurality of files and transfers a file segment on an output upon request. A second server also has an associated file repository and receives and stores the file segment in the associated file repository. The second server identifies if there are additional segments of the same file in the associated file repository and processes the received file segment together with the additional identified file segments to identify the presence of malware. Finally, the second server transfers the received file segment on an output as a scanned file segment only if no malware is identified. A third server has an associated file repository and is configured to receive and store the scanned file segments in the associated file repository and to transfer a received scanned file segment to a client.

14 Claims, 5 Drawing Sheets

FIG. 1

PRIOR ART

FIG. 2

PRIOR ART

SYSTEM AND METHOD FOR INTEGRITY ASSURANCE OF PARTIAL DATA

FIELD

The present invention relates generally a system and method for ensuring the integrity of partial data.

BACKGROUND

Protection of a computer or data network from undesired and unauthorized data disclosure, interception or alteration has been a perennial concern in the field of computer and network security. For example, firewall and anti-spyware software have been developed to address security concerns for computers and networks connected to the Internet and to protect them from possible cyber-attacks such as Trojan horse-type viruses or worms that may trigger undesired and unauthorized data disclosure by these computers and networks. However, for high security computer networks such as those used by government agencies and intelligence community and certain commercial applications, conventional network security devices such as firewalls may not provide sufficiently reliable protection from undesired data disclosure.

Alternative network security methods and devices based on unidirectional data transfer have been devised to address the network security concern. For example, U.S. Pat. No. 5,703,562 to Nilsen ("the '562 Patent"), the contents of which are hereby incorporated by reference in its entirety, provides an alternative way to address the network security concern. The '562 Patent discloses a method of transferring data from an unsecured computer to a secured computer over a one-way optical data link comprising an optical transmitter on the sending side and an optical receiver on the receiving side. By providing such an inherently unidirectional data link to a computer/data network to be protected, one can eliminate any possibility of unintended data leakage out of the computer/data network over the same link.

Any data link that strictly enforces the unidirectionality of data flow is called a one-way link or one-way data link. In other words, it is physically impossible to send information or data of any kind through a one-way data link in the reverse direction. A one-way data link may be hardware-based, software-based, or based on some combination of hardware and software.

Figure 1:
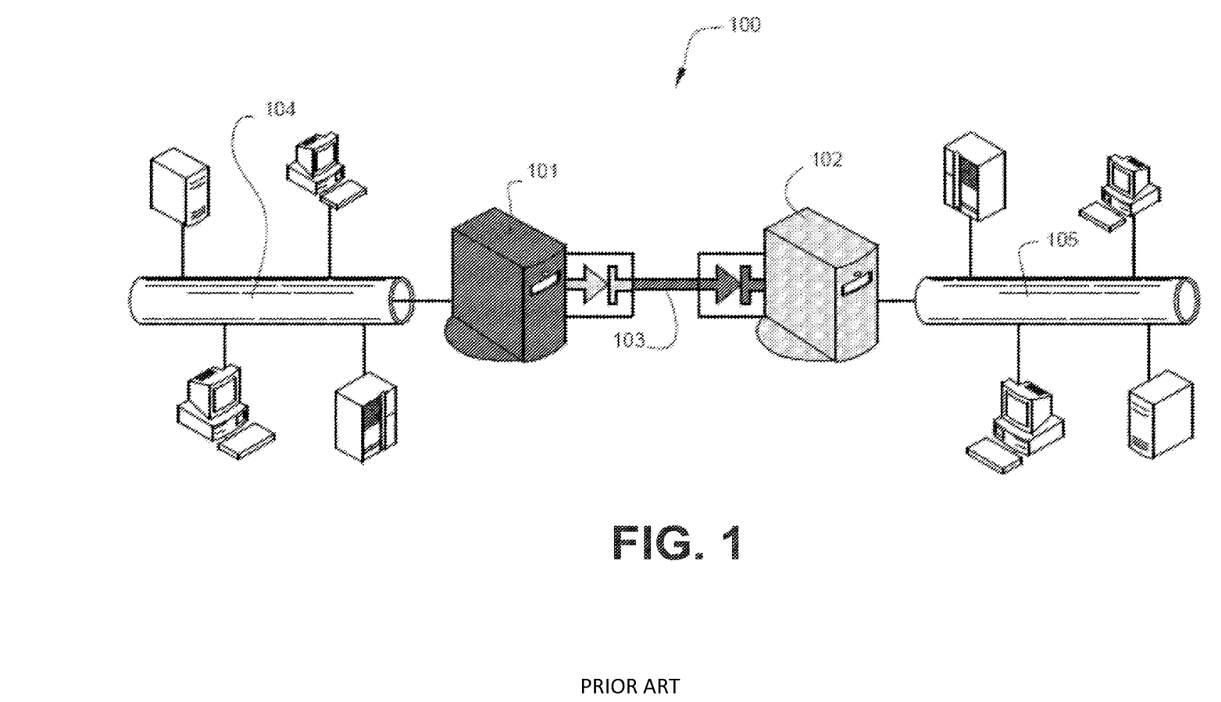
FIG. 1 schematically illustrates an example of a secure one-way data transfer system using a one-way data link.

One-way data transfer systems based on such one-way data links provide network security to data networks by isolating the networks from potential security breaches (i.e., undesired and unauthorized data flow out of the secure network) while still allowing them to import data from the external source in a controlled fashion. FIG. 1 schematically illustrates an example of one such one-way data transfer system 100. In the one-way data transfer system shown in FIG. 1, two computing platforms 101 and 102 (respectively, "the send platform" and "the receive platform") are connected to the unsecured external network 104 ("the source network") and the secure network 105 ("the destination network"), respectively. The send platform 101 is connected to the receive platform 102 by a one-way data link 103, which may be an optical link comprising, for example, a high-bandwidth optical fiber. This one-way optical data link 103 may be configured to operate as a unidirectional data gateway from the source network 104 to the secure destination network 105 by having its ends connected to an optical transmitter on the send platform and to an optical receiver on the receive platform.

A configuration such as the one shown in FIG. 1 physically enforces one-way data transfer at both ends of the optical fiber connecting the send platform 101 to the receive platform 102, thereby creating a truly unidirectional data transfer link between the source network 104 and the destination network 105. One-way data transfer systems based on a one-way data link are designed to transfer data or information in only one direction, making it physically impossible to transfer any kind of data, such as handshaking protocols, error messages, or busy signals, in the reverse direction. Such physically imposed unidirectionality in data flow cannot be hacked by a programmer, as is often done with firewalls, where unidirectional rules are software-protected (e.g., password authentication, etc.). Accordingly, the one-way data transfer system based on a one-way data link ensures that data residing on the isolated destination secure computer or network is maximally protected from any undesired and unauthorized disclosure. Alternatively, the source network is isolated from any malware contained in the destination network.

Software systems and applications, whether for direct use on a computer or embedded in other devices (e.g., firmware), often need to be installed and/or updated before initial use or periodically during the lifetime of such computer or device (i.e., to update to a new version or release). Such updates may add features, fix known problems and/or support the connection to or use of additional hardware and software components and systems. An initial software version or a software update (collectively a "payload" or "install payload") may be delivered by the software or device manufacturer (or its agent) via recorded physical digital media (e.g., CDs, DVDs, USB drives, hard drives, etc.) or by making it available on an online server for delivery to or retrieval by an end user of the software or device. In some cases, e.g., a surgically-implanted device having internal updatable software/firmware, the payload may only be loaded into the device at a physician's office or other secure healthcare facility via a specialized programming apparatus.

There are cases in which the install payload could be compromised as the result of malicious modifications to code residing either on a physical media or on an online server. In other scenarios, regulatory and/or security requirements may forbid the introduction of physical media into a facility where the systems requiring the install payload is needed, e.g., because of the secure nature of such facility. For these scenarios, connecting to any external network may also be forbidden because of the danger posed by information exfiltration and exposure to malware as discussed above.

Figure 2:
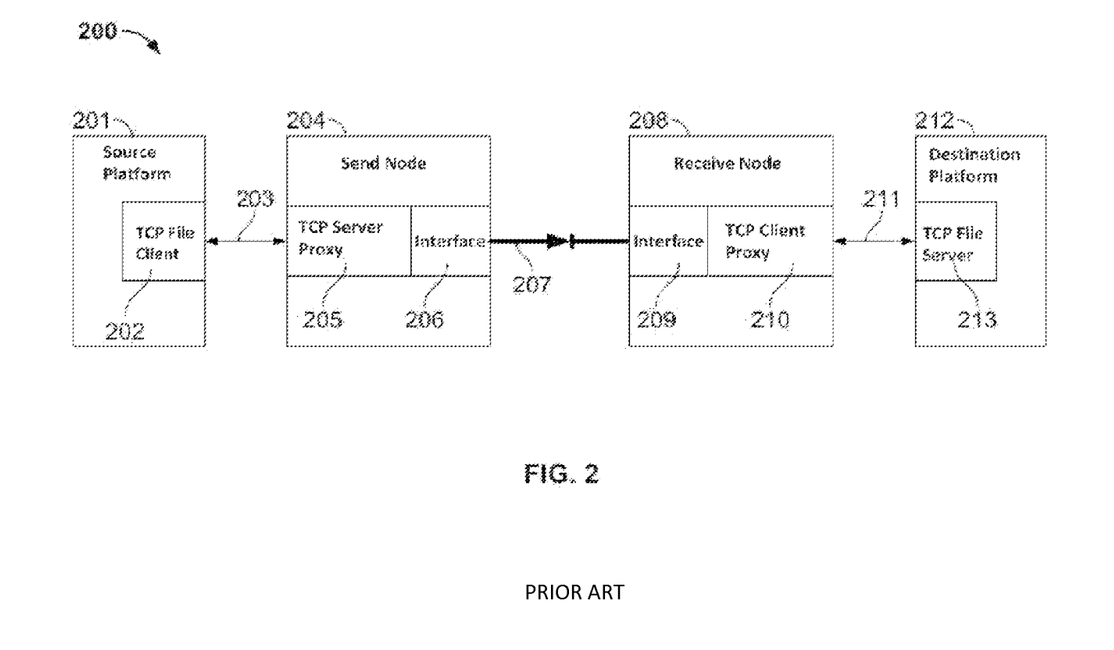
FIG. 2 is a functional block diagram that schematically illustrates TCP-based file transfer across a one-way data link.

As described in U.S. Pat. No. 8,352,450, issued on Jan. 8, 2013, the contents of which are incorporated herein by reference, files based on various conventional transport protocols may be transferred across a one-way data link under suitable arrangements. The following example illustrates transfer of files based on the Transmission Control Protocol (TCP) across a one-way data link. FIG. 2 is a functional block diagram that schematically illustrates implementation of a TCP-based secure file transfer across a single one-way data link in a one-way data transfer system 200.

Construction of the conventional TCP sockets requires bilateral communications since it requires an acknowledgement channel from the receive node to the send node. Accordingly, the conventional TCP/IP protocol cannot be implemented directly in a one-way data transfer system based on a one-way data link, since no bilateral "hand shaking" is allowed over the one-way link due to physical enforcement of unidirectionality of data flow. Instead, the one-way data transfer system 200 illustrated in FIG. 2 uses a TCP simulation application called TCP proxy, which is preferably a TCP/IP socket-based proxy software, but may also be hardware-based or based on a suitable combination of software and hardware, to simulate the TCP/IP protocol across the one-way data link 207.

In FIG. 2, a TCP server proxy 205 fully implements the TCP/IP protocol in its bilateral communications 203 with the upstream TCP file client 202 residing in a source platform 201. The TCP server proxy 205 may reside within the send node 204 as shown in FIG. 2, or alternatively, may be separate from but coupled to the send node 204. After the TCP server proxy 205 receives files from the TCP file client 202, the send node 204 sends the files through its interface 206 to the one-way data link 207. After the receive node 208 receives the files through its interface 209 from the one-way data link 207, the TCP client proxy 210 communicates under the full implementation of the TCP/IP protocol with a TCP file server 213 residing in a destination platform 212 and forwards the received files to the TCP file server 213. The TCP client proxy 210 may reside within the receive node 208 as shown in FIG. 2, or alternatively, may be separate from but coupled to the receive node 208.

In certain situations, it would be advantageous to use a one-way data link with an independent link layer protocol for one-way transfer so that non-routable point to point communications with a true IP protocol break can be enforced. With these properties, data packets or files cannot be accidentally routed in the network and other protocols (such as printer protocols, etc.) will not route across the one-way data link. An exemplary configuration enforcing such non-routable point to point communications with a true IP protocol break can be implemented in the one-way file transfer system 200 of FIG. 2. The TCP-based file transfer system 200 may be configured to prohibit transmission of IP information across the one-way data link 207. When the TCP server proxy 205 receives a file from the TCP file client 202, it removes the IP information normally carried in the file data packet headers under the TCP/IP protocol and replaces it with pre-assigned point-to-point channel numbers, so that no IP information is sent across the one-way data link 207. Instead, predetermined IP routes may be defined at the time of the configuration of the system 200 in the form of channel mapping tables residing in the TCP server proxy 205 associated with the send node 204 and the TCP client proxy 210 associated with the receive node 208. The send node 204 then sends the files with the pre-assigned channel numbers to the receive node 208 through its interface 206 across the one-way data link 207, which are received by the receive node 208 through its interface 209. Upon receipt of the files, the TCP client proxy 210 then maps the channel numbers from the received files to the corresponding predetermined IP address of a destination platform 212, to which the files are forwarded.

For the security of the overall one-way file transfer system 200, the IP address-to-channel number mapping table residing in the send node 204 may be different from the channel number-to-IP addressing mapping table residing in the receive node 208, and furthermore, neither table may be re-constructed on the basis of the other table. Neither table alone reveals the overall IP routing configuration from the source platform 201 to the destination platform 212. In this way, the IP information of the destination platform 212 may remain undisclosed to the sender at the source platform 201 and the security of the overall system 200 can be maintained.

Under the conventional TCP/IP protocol, the acknowledgement mechanism requiring bilateral communications may provide for error detection. However, the one-way data link 207 forecloses such means. Instead, the one-way data transfer system 200 may assure file integrity by applying, for example, a hash algorithm such as MD5 to each file being transferred over the one-way data link 207. The send node 204 calculates an MD5 hash number for the file and sends the resulting hash number along with the file to the receive node 208 over the one-way data link 207. When the receive node 208 receives the file, it may re-calculate a hash number for the received file and compare the result with the hash number calculated by the send node 204. By comparing these results, the receive node 208 may be able to determine as to whether any error has occurred during the file transfer across the one-way data link.

The risk for the compromise of file data integrity increases over time, whether the data is being transmitted over a network or at rest in storage. This is due to data being exposed to network components (when in transit) or available for examination and modification (when stored).

Certain networks are particularly sensitive to importing file data from sources outside of its perimeter, and usually scan the file for malware prior to its intake to protect the network and equipment coupled to the network. A problem arises if the file is being moved in a piece-meal fashion, as opposed to all at once, since portions of malware may look innocent to a scanner when viewed separately, but become harmful when reassembled. This scenario can happen when a file is remotely mounted on a server outside of the perimeter of a network and when parts of the file are transferred by browsing or other access methods. This scenario may occur in particular when using a distributed file system across a network, for example NFS (Network File System).

Figure 3:
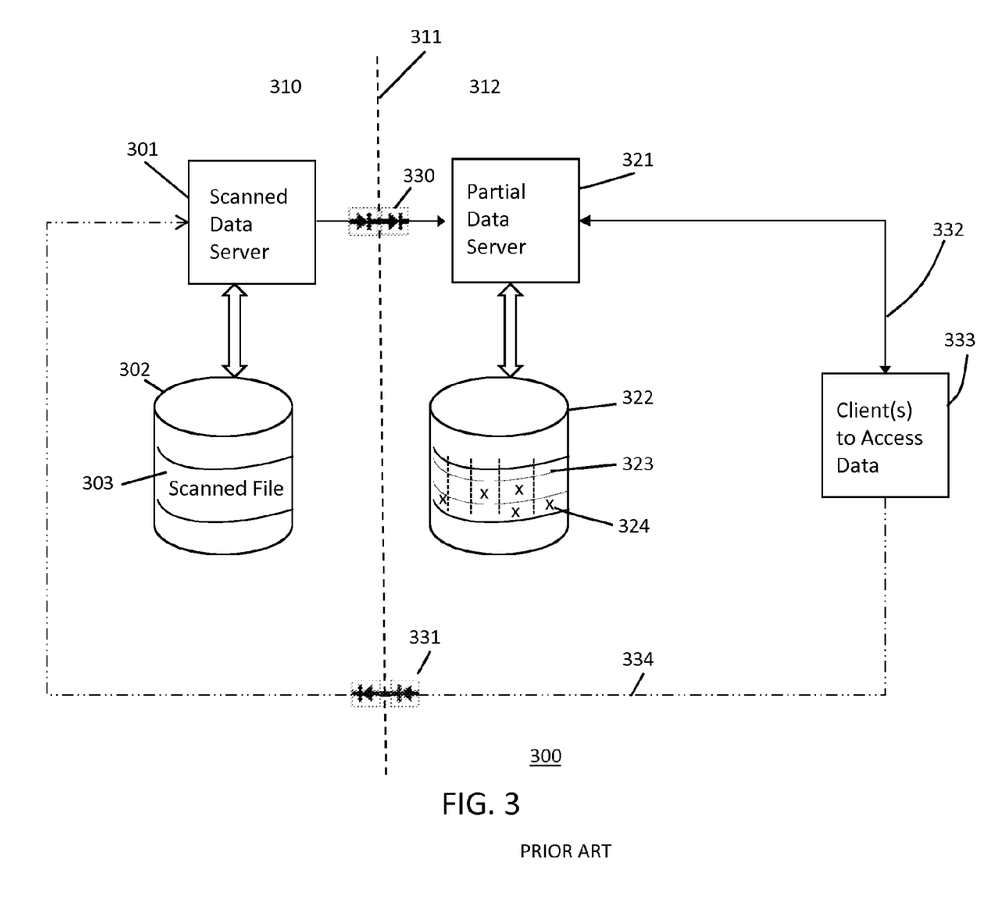
FIG. 3 is a block diagram of a conventional system for transferring partial data.

FIG. 3 shows a typical system 300 for transferring information from a lower security enclave 310 into a higher security enclave 312 (across the security border 311). System 300 includes a scanned data server 301 coupled to a file repository 302 in the first security enclave 310 and a partial data server 321 coupled to a file repository 322 in the second security domain. The scanned data server 301 is coupled to the partial data server 321 via a one-way data link 330. One way data link 330 allows data to flow from the lower security enclave 310 into the higher security enclave 312 and prevents data from flowing in the reverse direction. One or more clients 333 are coupled to the partial data server 321 for accessing data on file repository 322. The data flowing across one-way diode 330 may be pushed by scanned data server 301 or may be requested by a client 333, for example via a separate link 334 which is also protected by a one-way data link 331 in the opposite direction. The two one-way data links 330, 331 operate as described in U.S. Pat. No. 7,992,209 B1 to Menoher et al. ("the '209 Patent"), incorporated by reference in its entirety herein, in maintaining data from each link 330, 331 separate. Data may also be requested by client 333 via an out-of-band medium. Even if the files (e.g., file 303 shown in FIG. 3) on the lower security enclave 310 are scanned prior to their placement into storage and later retrieval by the scanned data server 301, the integrity of such files cannot be guaranteed over time. This is not of great concern when a file is transmitted in its entirety to the higher security enclave 312, since the file may be rescanned as part of the transfer process. However, issues arise when partial file transfers (i.e., when only segments 324 of a complete file 323) are performed because it is not possible to scan these segments 324 alone to ensure they are free from malware. As one of ordinary skill in the art will readily appreciate, a virus or other malware-type infection may occupy only part of a file, but may span an area in the file greater than the file segment. In such situations, scanning of each file segment alone will not identify the virus or other malware.

The present invention provides a method and system which overcomes the problems of the prior art. Other advantages of the present invention will become apparent from the following description.

SUMMARY

The present invention is directed to a system for assuring the integrity of file segments that includes a first server, a second server and a third server. The first server is coupled to a first file repository for storing a plurality of files and is configured to transfer a segment of a particular stored file upon request on an output. The second server has an input coupled to the output of the first server and an output. The second server is coupled to a second file repository and is configured to receive the segment of the particular stored file on the input, to store the received segment in the second file repository, to identify if there are additional segments of the particular stored file in the second file repository, to process the received segment of the particular stored file together with a predetermined number of identified additional segments of the particular stored file present in the second file repository to identify the presence of malware, and, only if no malware is found, to transfer the received segment of the particular stored file on an output as a scanned file segment. The third server has an input coupled to the output of the second server and an output for access by a client. The third server is coupled to a third file repository and is configured to receive scanned file segments on the input and to store the received scanned file segments in the third file repository. The third server is further configured to supply a received scanned file segment to the client via the output.

Preferably, the system also includes a first one-way data link coupled between the first server and the second server, with an input coupled to the output of the first server and an output coupled to the input of the second server. The system also preferably includes a second one-way data link coupled between the second server and the third server, with an input coupled to the output of the second server and an output coupled to the input of the third server.

In a further embodiment, the second server is configured to process the received segment of the particular stored file together with the identified additional segments of the particular stored file present in the second file repository by scanning for predefined malware patterns. In an alternative further embodiment, the second server is configured to process the received segment of the particular stored file together with the identified additional segments of the particular stored file present in the second file repository by execution in a controlled environment.

In a still further embodiment, the system may preferably further include a third one-way data link having an input coupled to the second server and an output coupled to the first server, with the second server further configured to sequentially request at least one additional segment of the particular stored file currently being processed from the first server, to store the requested at least one additional segment in the second file repository upon receipt, to identify if there are additional segments of the particular stored file in the second file repository, to process the requested at least one additional segment of the particular stored file together with the identified additional segments of the particular stored file present in the second file repository to identify the presence of malware, and, only if no malware is found, to store the received additional segment of the particular stored file in the second file repository as a prefetched and scanned file segment. Still further, the second server may be further configured, prior to processing the received segment, to determine if the received segment of the particular file exists in the second file repository as a prefetched and scanned file segment, and if so, instead of processing the received segment, to compare the received segment to the corresponding prefetched and scanned file segment and, only if the received segment and the corresponding prefetched and scanned file segment are identical, to transfer the received segment of the particular stored file on an output as a scanned file segment.

In one embodiment, the predetermined number of additional segments is all of the additional segments. In another embodiment, the predefined malware patterns have a maximum file size and the predetermined number of additional segments constitutes the number of segments which together constitute the maximum file size.

The system includes, in a still further embodiment, a fourth one-way data link having an input coupled to the client and an output coupled to the first server, with the first server further configured to receive requests for a particular segment of a particular file stored in the first file repository via the fourth one-way link.

The present invention is also directed to a computer implemented method for identifying malware in file segments. In the method, a segment of a particular stored file on an input is received and then stored in a file repository. Next, the method identifies if there are additional segments of the particular stored file in the file repository and then the received segment of the particular stored file together with a predetermined number of identified additional segments of the particular stored file present in the file repository are processed to identify the presence of malware. Finally, only if no malware is found in the processing step, the received segment of the particular stored file are transferred on an output as a scanned file segment. In one further embodiment, the predetermined number of additional segments is all of the additional segments. In an alternative embodiment, the received segment of the particular stored file together with the identified additional segments of the particular stored file present in the second file repository is processed by scanning for predefined malware patterns. Preferably, the predefined malware patterns have a maximum file size and the predetermined number of additional segments constitutes the number of segments which together constitute the maximum file size.

BRIEF DESCRIPTION OF THE DRAWINGS

The above and related objects, features and advantages of the present invention will be more fully understood by reference to the following, detailed description of the preferred, albeit illustrative and exemplary, embodiments of the present invention when taken in conjunction with the accompanying figures, wherein.

DETAILED DESCRIPTION

In the present disclosure, like reference numbers refer to like elements throughout the drawings, which illustrate various exemplary embodiments of the presently disclosed system. Although the presently disclosed system will be discussed with reference to various illustrated examples, these examples should not be read to limit the broader spirit and scope of the present invention.

Figure 4:
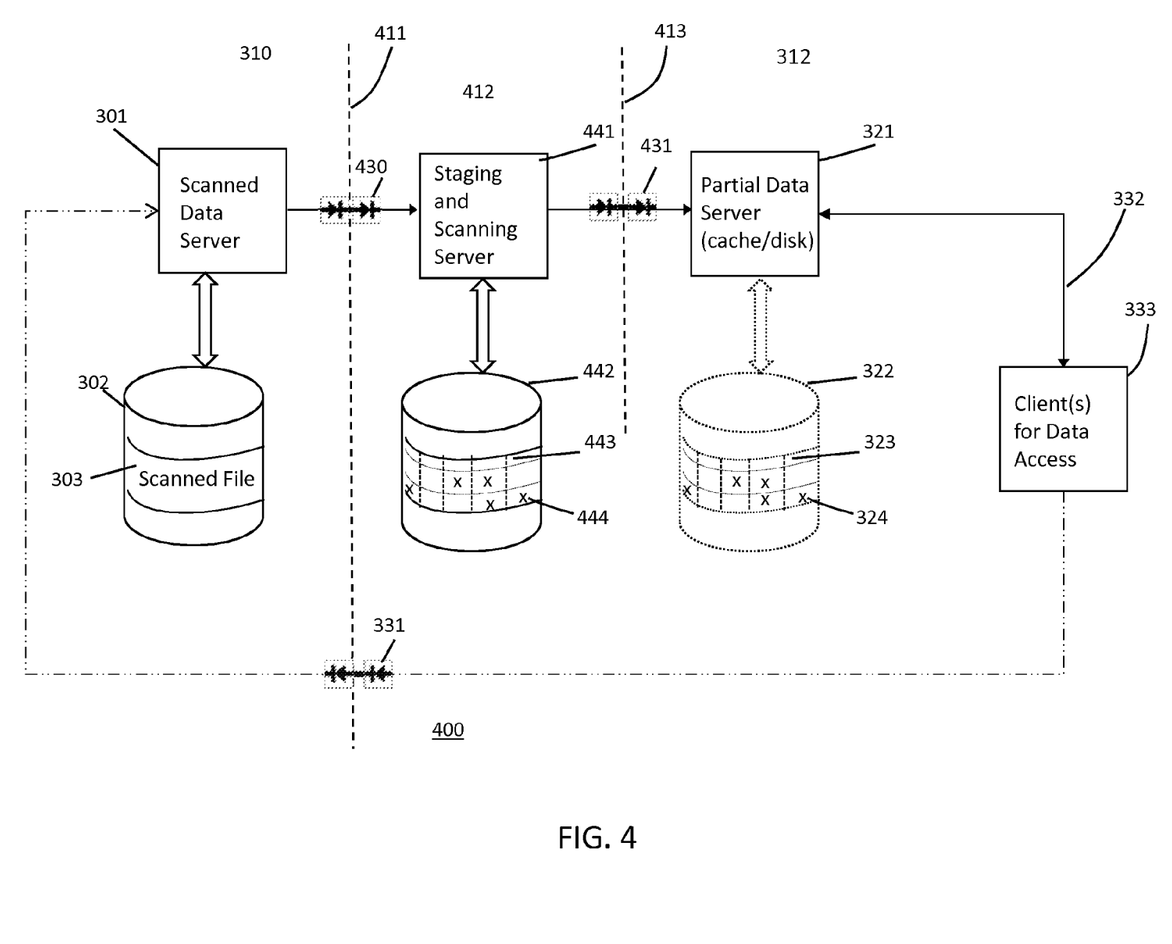
FIG. 4 is a block diagram of a first exemplary embodiment of the present invention.

FIG. 4 illustrates system 400 for mitigating the risk of malware being present in a file being transferred in segments from passing undetected into a protected network enclave 414 by using a cumulative approach to malware scanning System 400 provides the capability to continuously assure that a file remains uncompromised without the need to continuously scan the whole file for malware prior to its transfer. This level of assurance applies at all levels of file granularity, from individual data records (e.g., messages, frames, or images) to partial or even entire collections of data (e.g., files, databases or data streams).

System 400 depicted in FIG. 4 adds an intermediate enclave 412, a staging enclave, between the lower security enclave 310 and the higher security enclave 312. This intermediate enclave 412 enables the scrutiny of file segments 444 being moved from the lower security enclave 310 to the higher security enclave 312 in the isolated enclave 412, meaning any information kept in enclave 412 cannot be corrupted via access from the lower security enclave 310, and cannot adversely impact the integrity of the higher security enclave 312 since it has yet to reach it.

Current technology for malware scanning relies heavily on the detection of patterns within infected files, as well as sandbox execution to detect malicious behavior. These processes work well when a whole file is being examined as a unit, but may fail to uncover hidden malware when scrutinizing file segments in isolation (i.e., separately). Staging and scanning server 441 and associated file repository 442 are added to system 300 to addresses these issues. Staging and scanning server 441 is coupled to the scanned data server 301 via a first one-way data link 430 and to partial data server 321 via a second one-way link 431. The first one-way data link 430 crosses the boundary 411 between the lower security enclave 310 and the intermediate security enclave 412, and only allows data to pass from the lower security enclave 310 to the intermediate security enclave 412. The second one-way data link 431 crosses the boundary 413 between the intermediate security enclave 412 and the higher security enclave 312, and only allows data to pass from the intermediate security enclave 412 to the higher security enclave 312. Server 441 maintains a copy of all segments 444 (portions) of a file 443 which have already been transmitted to the higher security enclave (i.e., the segments 324 shown in FIG. 4). When a new segment is passed from the scanned data server 301 in the lower security enclave 310, the new segment is placed with other segments of the same file (if present) and the overall collection (i.e., the portions of file 443 that currently exist on file repository 442) is scanned for malware patterns, or executed in a controlled environment, in order to determine if the overall collection (i.e., the file segments transferred up to that point in time) includes a virus or other malware of one sort or another.

If a malware pattern is identified, server 441 does not pass the latest file segment to partial data server 321 in the higher security domain 312. Based on user-determined specific policies and corresponding workflows, the rest of the file may be quarantined or purged and additional segments of the same file may or may not be permitted to flow to partial data server 321. In this situation, even if the complete file contains malware, whatever portions of such already present in the higher security enclave 312 do not present a threat because the "missing piece" (i.e., the latest blocked segment) necessary to make the malware operational was detected and blocked from passing into the higher security enclave 312.

System 400 illustrates an application of one-way data links to assure the integrity of partial file data (i.e., segments of complete files). In addition to having integrity assurance properties, the system 400 also supports access to file segments with the same assurance level as when the complete file is available for examination. This functionality is useful when transferring the complete file may be too costly or not feasible.

Figure 5:
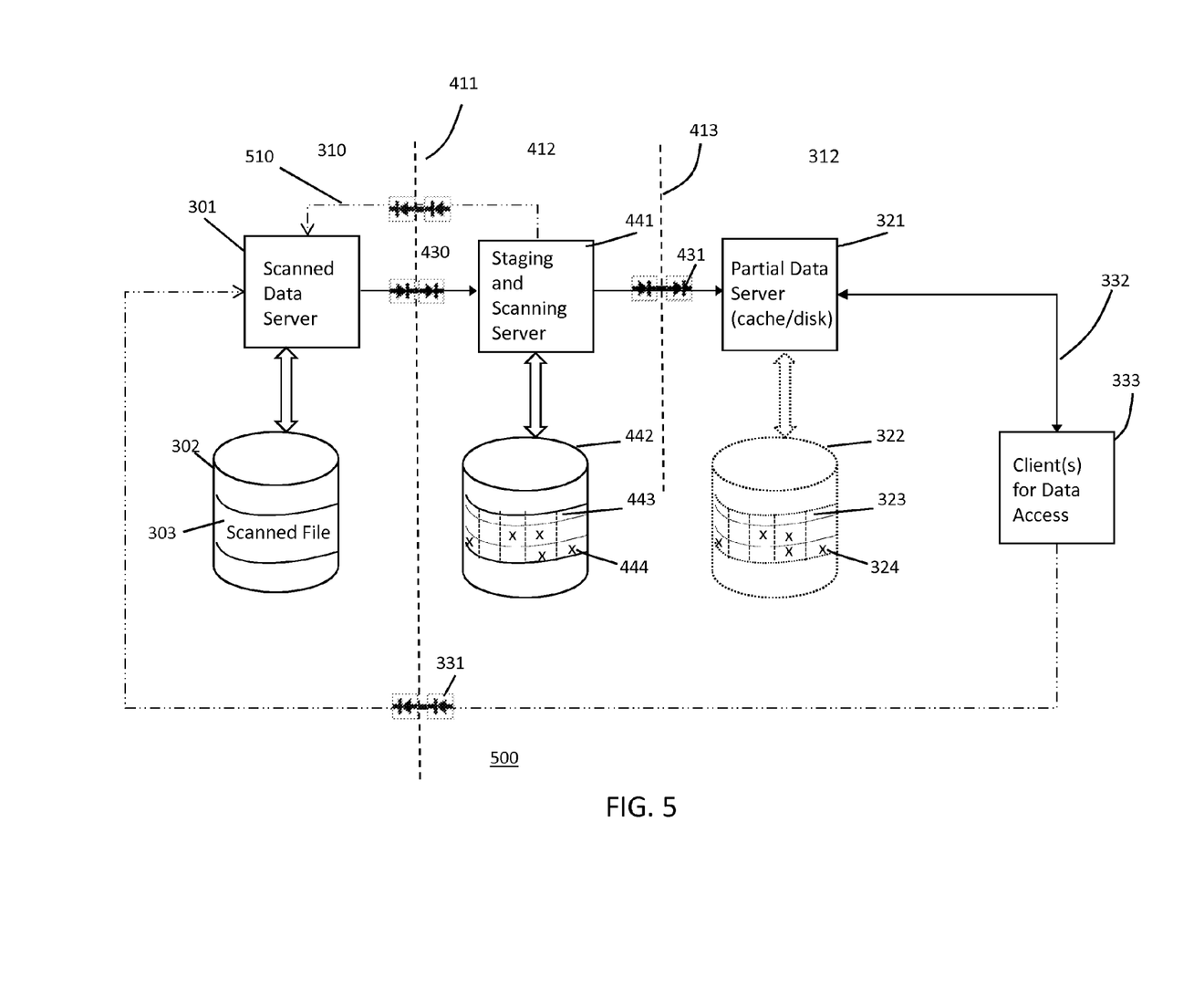
FIG. 5 is a block diagram of a second exemplary embodiment of the present invention.

Referring now to FIG. 5, the need to scan a collection of segments in the staging enclave 441 will introduce a delay (caused by the scanning) in delivering the segments to the client 333 in the higher security enclave that requested data from the lower security enclave 310. It is possible to greatly reduce this delay by prefetching file segments from the lower security enclave 310 into the staging enclave 412 and scanning the prefetched file segments in advance of a request from a client 333 in the higher security enclave 312 for such segments. System 500 includes an additional one-way data link 510 that enables communications (in particular prefetch file requests) from staging and scanning server 441 to scanned data server 301. In all other respects, system 500 is the same as system 400.

Staging and scanning server 441 may employ one of a variety of prediction algorithms to request segments for prefetching in a way that is transparent to the client 333. For example, assuming a sequential access pattern to segments, the n segments following the current request from the client may be independently requested by the staging and scanning server 441 via one-way data link 510. These segments are scanned and stored in the staging enclave 412 as if they had been requested by the client. When segments actually requested by the client arrive at the staging and scanning server 441, a check is first made to determine whether that particular segment is already resident locally (either because it was pre-fetched or previously requested by a client), and if so it compares the contents of the arriving segment and its local copy. If the two are identical, the segment is allowed to proceed to the higher security enclave 412 since it has already been scanned in context with the other portions of the file already transferred. A comparison between segments is much faster than scanning, resulting in a performance gain. Other segment prefetching algorithms include prefetching a fixed size segment "window" around a requested segment, tracking the number of times certain segments are requested, etc.

Another option to improve performance of the staging and scanning server 441 is to restrict the scope of malware scanning to portions of the file being staged, instead of performing a full scan every time. For example, when applying pattern ("signature") based scans, the pattern may have a limited size in number of bytes. Clearly, there is no need to scan nearby segments which have already been scanned, if the distance between them and the newly added segment is greater than the size of the malware pattern.

Rather, it makes sense to focus on adjacent segments, and even then, those which together with the segment under examination fit under a certain size limit.

Although the preferred embodiment shows a one-way data link 430 between scanned data server 301 and staging and scanning server 441, and a one-way data link 431 between staging and scanning server 441 and partial data server 321 in system 300 (FIG. 4) and system 500 (FIG. 5), one of ordinary skill in the art will readily recognize that other types of interfaces may be used to restrict data flow in the opposite direction, e.g., firewalls.

While this invention has been described in conjunction with exemplary embodiments outlined above and illustrated in the drawings, it is evident that many alternatives, modifications and variations will be apparent to those skilled in the art. Accordingly, the exemplary embodiments of the invention, as set forth above, are intended to be illustrative, not limiting, and the spirit and scope of the present invention is to be construed broadly and limited only by the appended claims, and not by the foregoing specification.

What is claimed is:

1. A system for assuring the integrity of file segments being transferred from a first file repository in a first security domain to a client in a second separate security domain, comprising:
    a first server in the first security domain coupled to the first file repository for storing a plurality of files, the first server configured to transfer a segment of a particular stored file on an output upon request;
    a second server outside the first security domain and outside the second security domain, the second server having an input coupled to the output of the first server via a first dedicated communications link and an output, the second server coupled to a second file repository outside the first and second security domains, the second server configured to receive the segment of the particular stored file on the input, to store the received segment in the second file repository, to identify if there are additional segments of the particular stored file in the second file repository, to process the received segment of the particular stored file together with a predetermined number of identified additional segments of the particular stored file present in the second file repository to identify the presence of malware, and, only if no malware is found, to transfer the received segment of the particular stored file on an output as a scanned file segment; and
    a third server in the second security domain having an input coupled to the output of the second server via a second dedicated communications link and an output for access by a client, the third server coupled to a third file repository in the second security domain and configured to receive scanned file segments on the input and to store the received scanned file segments in the third file repository, the third server further configured to supply a received scanned file segment to the client via the output.

2. The system of claim 1, wherein the first dedicated communications link comprises:
    a first one-way data link coupled between the first server and the second server, with an input coupled to the output of the first server and an output coupled to the input of the second server.

3. The system of claim 1, wherein the second dedicated communications link comprises:
    a second one-way data link coupled between the second server and the third server, with an input coupled to the output of the second server and an output coupled to the input of the third server.

4. The system of claim 1, wherein the second server is configured to process the received segment of the particular stored file together with the identified additional segments of the particular stored file present in the second file repository by scanning for predefined malware patterns.

5. The system of claim 4, wherein the predefined malware patterns have a maximum file size and the predetermined number of additional segments constitutes the number of segments which together constitute the maximum file size.

6. The system of claim 1, wherein the second server is configured to process the received segment of the particular stored file together with the identified additional segments of the particular stored file present in the second file repository by execution in a controlled environment.

7. The system of claim 1, further comprising a third one-way data link having an input coupled to the second server and an output coupled to the first server, and wherein the second server is further configured to sequentially request at least one additional segment of the particular stored file currently being processed from the first server, to store the requested at least one additional segment in the second file repository upon receipt, to identify if there are additional segments of the particular stored file in the second file repository, to process the requested at least one additional segment of the particular stored file together with the identified additional segments of the particular stored file present in the second file repository to identify the presence of malware, and, only if no malware is found, to store the received additional segment of the particular stored file in the second file repository as a prefetched and scanned file segment.

8. The system of claim 7, wherein the second server is further configured to, prior to processing the received segment, determine if the received segment of the particular file exists in the second file repository as a prefetched and scanned file segment, and if so, instead of processing the received segment, to compare the received segment to the corresponding prefetched and scanned file segment and, only if the received segment and the corresponding prefetched and scanned file segment are identical, to transfer the received segment of the particular stored file on an output as a scanned file segment.

9. The system of claim 1, wherein the predetermined number of additional segments is all of the additional segments.

10. The system of claim 1, further comprising a fourth one-way data link having an input coupled to the client and an output coupled to the first server, and wherein the first server is further configured to receive requests for a particular segment of a particular file stored in the first file repository via the fourth one-way link.

11. A computer implemented method for identifying malware in file segments being transferred from a first file repository in a first security domain to a second file repository in a second separate security domain, the method comprising the steps of:
    receiving, in a server outside of the first security domain and outside of the second security domain, a segment of a particular stored file on an input coupled to the first file repository in the first security domain via a first dedicated communications link;

storing the received segment in an intermediary file repository that is outside the first and second security domains;

identifying if there are additional segments of the particular stored file in the intermediary file repository;

processing the received segment of the particular stored file together with a predetermined number of identified additional segments of the particular stored file present in the intermediary file repository to identify the presence of malware; and only if no malware is found in the processing step, transferring the received segment of the particular stored file on an output coupled to the second file repository in the second security domain via a second dedicated communications link as a scanned file segment.

12. The computer implemented method of claim 11, wherein the predetermined number of additional segments is all of the additional segments.

13. The computer implemented method of claim 11, wherein the received segment of the particular stored file together with the identified additional segments of the particular stored file present in the intermediary file repository is processed by scanning for predefined malware patterns.

14. The computer implemented method of claim 13, wherein the predefined malware patterns have a maximum file size and the predetermined number of additional segments constitutes the number of segments which together constitute the maximum file size.

* * * * *